(No Model.)
E. H. LUNKEN.
LUBRICATOR.
No. 498,438. Patented May 30, 1893.
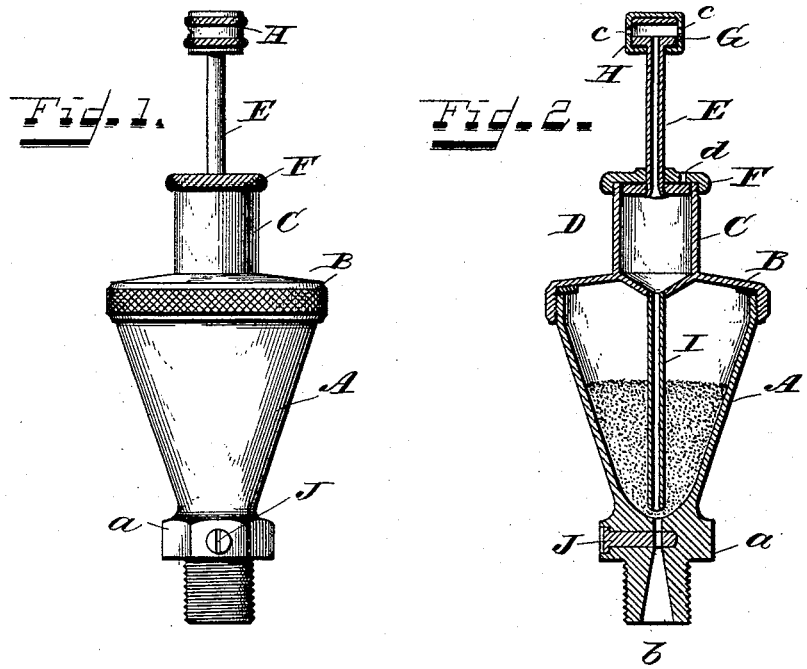
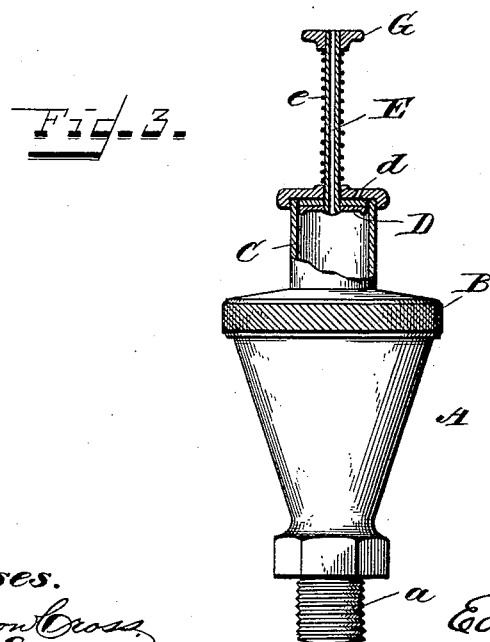
Witnesses.
J. Thomson Cross
Bernard J. Hausfeldt
Inventor.
Edmund H. Lunken
by Chas. M. Peck
his Attorney.

UNITED STATES PATENT OFFICE.

EDMUND H. LUNKEN, OF CINCINNATI, OHIO, ASSIGNOR TO THE LUNKENHEIMER COMPANY, OF SAME PLACE.

LUBRICATOR.

SPECIFICATION forming part of Letters Patent No. 498,438, dated May 30, 1893.

Application filed October 15, 1892. Serial No. 448,974. (No model.)

*To all whom it may concern:*

Be it known that I, EDMUND H. LUNKEN, a citizen of the United States, residing at Cincinnati, in the county of Hamilton and State of Ohio, have invented certain new and useful Improvements in Lubricators, of which the following is a full, clear, and exact description, reference being had to the accompanying drawings, forming part of this specification.

My invention relates to that class of lubricators employing a powdered lubricant, such as graphite, either dry or mixed with oil, and it has for its object the improved construction of the same whereby the simplicity and efficiency of the lubricator are increased and whereby even discharges of the lubricant are insured.

The novelty of my invention will be hereinafter set forth and specifically pointed out in the claims.

In the accompanying drawings: Figure 1 is an elevation of a lubricator embodying my invention. Fig. 2 is a central sectional elevation of the same. Fig. 3 is an elevation partly in section, showing a modification in the construction.

The same letters of reference are used to indicate identical parts in all the figures.

The body A of the lubricator is an inverted cone-shaped vessel or cup with a threaded attaching plug a at its lower end having a central orifice b, enlarged and flaring at its lower end, extending into the cup for the discharge of the lubricant. The top of the cup is, in this instance, a cap B screwed thereon and carrying above it a vertical cylinder or dash pot C into which is fitted a piston rod E extending up through an aperture in a cap F screwed upon the cylinder. The upper end of the rod e has a head or piston G fitted in a small cylinder or cap H having perforations c through its sides.

A pipe I extends down from the center of the cylinder C nearly to the bottom of the cup A just above the orifice b.

J is a screw plug having an orifice registering with the orifice b and for controlling the feed, and d is a vent in the cylinder C above the piston D.

The cup is secured by its plug into the bearing to be lubricated and the lubricant is placed in the cup by removing the cap B, or, where the cap is a part of the cup and not removable, through a filling hole provided for the purpose.

The operation of the lubricator thus constructed is as follows: The operator takes hold of the cap H, and raises it, thereby uncovering the vents c and permitting air to pass down through the hollow rod E into the cylinder to prevent the lubricant being sucked up by the raising of the piston, through the pipe I. When the piston is entirely raised the operator presses down the box H, the first movement of which brings the vents c against the head G and closes them, and the continued downward movement forces the piston I down, thereby driving the air contained in the cylinder through the pipe I which action forces a charge of the lubricant below the pipe through the orifice b into the bearing and onto the journal to be lubricated, the flaring lower end of the orifice permitting the lubricant to spread, as will be readily understood. In this manner by pumping the piston the lubricant is fed in charges as desired. The vent d permits the air in the cylinder above the piston to escape on each up stroke.

In Fig. 3 the modification consists in dispensing with the cap H and surrounding the rod E with a coiled spring e which normally holds the rod and piston up and forces them up after each down stroke. In this construction it is only necessary to place a finger on the top of the rod, thereby closing the orifice through it, and to press down the rod and piston whereupon the charge of lubricant is ejected as before. The finger is removed at the end of the down stroke and the spring e at once throws the piston and rod up, the air entering beneath the piston through its hollow rod.

While I have shown and described the simplest and most compact form of construction that occurs to me yet I do not wish my invention to be restricted to the form or relative location of the parts, for such might be varied, and I wish my claims to be construed as broadly as the language of their terms implies, for I believe myself the first to employ an air forcing passage or pipe which extends into the cup and terminates at a point in line with and close to the discharge orifice so that in operation only that part of the lubricant around the discharge orifice is forced out and by which arrangement but slight force is required to feed the lubricant in charges to the bearing or part to be lubricated.

My invention is also applicable to hand lubricators for dry graphite which may be constructed as described above except that the screw plug would be omitted and the lower part of the cup surrounding the orifice $b$ would be nozzle-shaped so that it could be used in the same way that an ordinary oil can is used. Again, instead of having the pipe passing down through the body of the lubricant, it might be carried on the outside and made to enter the cup near the bottom either in the form of a pipe or in the form of an air passage formed in the wall of the cup, as will be readily understood.

Having thus fully described my invention, I claim—

1. In a lubricator, the combination of a cup, for the lubricant, having a discharge orifice at its lower end, a cylinder attached to said cup, a piston in said cylinder, a piston rod for actuating said piston, and an air passage from said cylinder into the cup, said air passage having its discharge end opposite the discharge orifice of the cup.

2. In a lubricator, the combination of a cup for the lubricant having a discharge orifice, a cylinder attached to said cup, a piston in said cylinder, a hollow piston rod for actuating said piston and conveying air below the same on its up stroke, and an air passage from said cylinder into the cup with its discharge end near the discharge orifice of the cup.

3. In a lubricator, the combination of a cup for the lubricant having a discharge orifice, a cylinder attached to said cup, a piston in said cylinder, a hollow piston rod for said piston, a sliding cap for said rod provided with vents closed by the down stroke and opened by the up stroke thereof, and an air passage extending from said cylinder into the cup with its discharge end near the discharge orifice of the cup.

4. In a lubricator, the combination of the conical cup A having a discharge orifice $b$ at its lower end, the cylinder C mounted on said cup, a pipe I extending from said cylinder into the cup and terminating near the discharge orifice, the piston D, the hollow piston rod E, and vented cap H free to slide on the end of said rod, substantially as described.

EDMUND H. LUNKEN.

Witnesses:
J. THOMSON CROSS,
BERNARD J. HAUSFELD.